GUIDED SUBTERRANEAN PENETRATOR SYSTEMS

Filed March 18, 1968 9 Sheets-Sheet 1

INVENTOR
H. SOUTHWORTH JR.
BY Leo Stanger
ATTORNEY

GUIDED SUBTERRANEAN PENETRATOR SYSTEMS

United States Patent Office 3,465,834
Patented Sept. 9, 1969

3,465,834
GUIDED SUBTERRANEAN PENETRATOR SYSTEMS

Hamilton Southworth, Jr., New York, N.Y., assignor to Bell Telephone Laboratories, Incorporated, Murray Hill and Berkeley Heights, N.J., a corporation of New York Filed Mar. 18, 1968, Ser. No. 713,602
Int. Cl. E21c *11/00;* B25d *9/12;* E21b *7/04*
U.S. Cl. 173—2 15 Claims

ABSTRACT OF THE DISCLOSURE

A subterranean penetrator is propelled in either the forward or rearward direction by repeatedly striking an interior forward or rear anvil with a hollow, cylindical, hydraulically operated hammer within the penetrator. The hammer slides on a central arm. It is actuated by guiding pressurized fluid from outside the penetrator to one of two chambers formed inside the hammer by a dividing wall fixed to the arm. The hammer stroke is regulated by controlling the onset of striking pressure on the basis of the hammer's position. A hydraulically operated ball joint between the penetrator's nose and tail permits it to be steered.

FIELD OF THE INVENTION

This invention relates to subterranean penetrators particularly for creating tunnels through which electrical or other utility cable may be drawn.

BACKGROUND OF THE INVENTION

U.S. Patent 3,137,483 discloses an example of an underground pneumatically powered penetrator or tunnelling tool using an interiorly reciprocating hammer. Such a penetrator can dig a tunnel through which underground cable may be passed. While such a penetrator is useful for short, straight tunnelling runs through substantially homogeneous soils, its performance for digging tunnels with curves or in nonhomogeneous soils has been found wanting. Where the penetrator must follow a curved course it is necessary to dig up the penetrator and redirect it at each turn.

Also, changes in the resistance of the soil, such as are caused by rocks in the penetrator path, may deflect the penetrator to a new unpredicable and undesirable path. Damage to buildings or other property may result. Furthermore, the hammer strokes that are suitable for driving the penetrator through stiff soils may drive the penetrator so easily through soft soils that the forward-moving housing might hit the back of the retracting hammer.

Moreover, such a penetrator, because it is pneumatically operated, is quite noisy. This restricts the hours during which it may be used in populated neighborhoods. Thus, penetrators such as those illustrated in the before-mentioned patent have not been extensively used for burying utilities such as telephone cables.

THE INVENTION

According to a feature of the invention the deficiencies of previously used underground penetrators are obviated by guiding the penetrator with a steering device, preferably on the basis of sensed positions, toward a destination. According to another feature of the invention, the penetrator is actuated hydraulically.

According to still another feature of the invention, the hammer that strikes the anvil to propel the penetrator is hydraulically actuated on the basis of position sensors such as Hall generators in the path of the hammer. Adjustable timing means regulate the rebound stroke of the hammer on the basis of its position. This permits selection of a maximum stroke length for each soil condition without the danger of the penetrator's being driven forward so fast that its rear housing strikes the back of the hammer during the hammer's rebound stroke.

According to still another feature of the invention the hammer slides on a central arm or shaft in an empty chamber of the penetrator. It is actuated by guiding pressurized fluid into one or the other of two chambers, formed in the hammer interior, by a dividing wall fixed to the shaft's exterior. The fluids thus reciprocate the hammer relative to the dividing wall against suitable anvils on the forward and rear ends of the shaft. Preferably suitable timing means responding to a sensor in the path of the hammer regulate the flow so as repeatedly to strike either only the forward or only the rear anvil.

According to still another feature of the invention, the penetrator is guided by flexing it about a ball joint near its center and adjusting the angle of its forward nose portion relative to its rear tail portion in response to the guidance signals by means of peripherally located plungers. Preferably the plungers are actuated by a combined electric hydraulic system that responds either to manual operation from a control outside the penetrator or from an automatic guidance system outside the penetrator which is operated by sensors or transmitters placed along the desired penetrator path.

Also, according to a feature of the invention, pistons communicating on one side with the respective chambers and on the other side with air pressurized cavities inside the hammer, absorb the pressure transients in the chambers.

By virtue of these features, the penetrator can be reliably guided wih a minimum of noise through nonhomogeneous soils toward a desired target around a circuitous course. Thus, it is unnecessary to dig up and redirect the penetrator for any changes in course.

These and other features of the invention are pointed out in the claims. Other objects of the invention will become obvious from the following detailed description when read in light of the following drawings:

DESCRIPTION OF PREFERRED EMBODIMENTS

Figure 1:
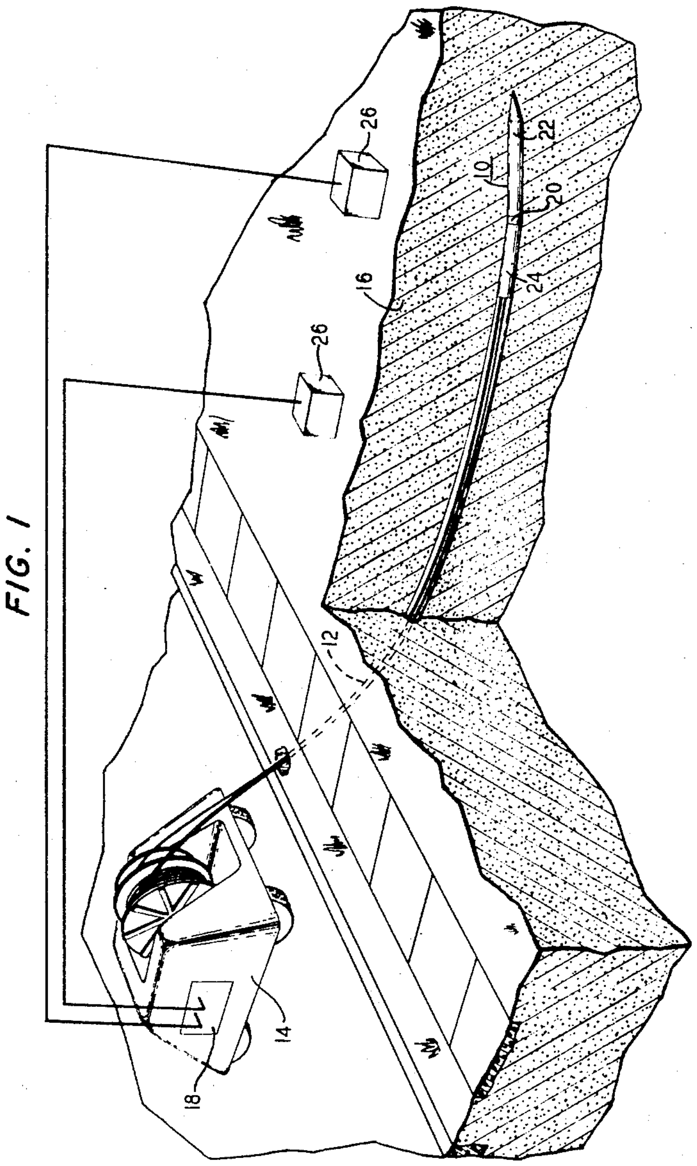
FIG. 1 is a perspective partially cutaway view of a penerator system embodying features of the invention.

In FIG. 1 a subterranean penetrator 10 receiving hydraulic fluid and electrical power through a connecting cable 12 from a surface vehicle 14 penetrates and advances substantially in a horizontal direction through subsurface soil 16 in response to signals from a control console 18 on the surface vehicle. An internal drive system operating on the hammer and anvil principle propels the penetrator through the soil. The penetrator 10 is hinged near its center by a coupler 20. The latter in response to signals from the control console 18 tilts the nose 22 of the penetrator 10 relative to the tail 24 so as to steer the penetrator as it advances through the soil. Several guidance devices 26 on the surface of the soil 16 coordinate with a steering control within the penetrator 10 to feed position information to a computer within the control console 18. This establishes the position of the penetrator 10 and allows the computer in the console 18 either to steer the penetrator automatically along a predetermined course or to pass information to an operator who can then steer the penetrator to its destination.

Figure 2:
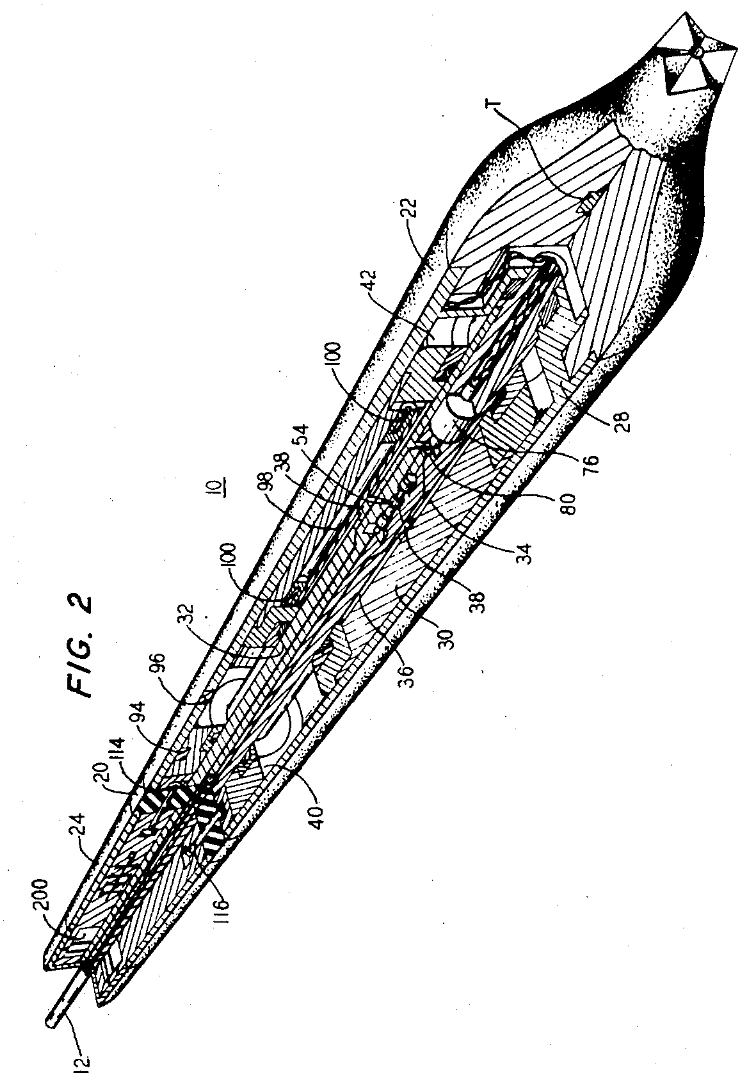
FIG. 2 is a partly sectional drawing illustrating the interior of the penetrator in FIG. 1.
Figure 3:
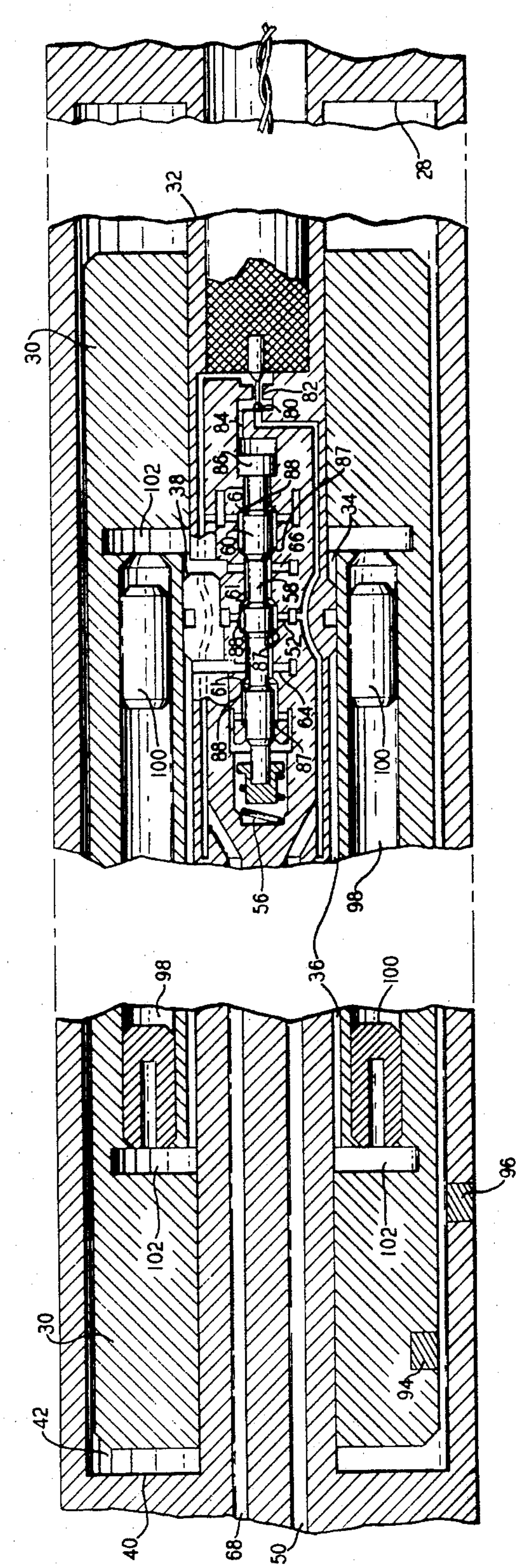
FIG. 3 is a section of the penetrator in FIG. 2 illustrating details of the hydraulic system of the penetrator.
Figure 4:
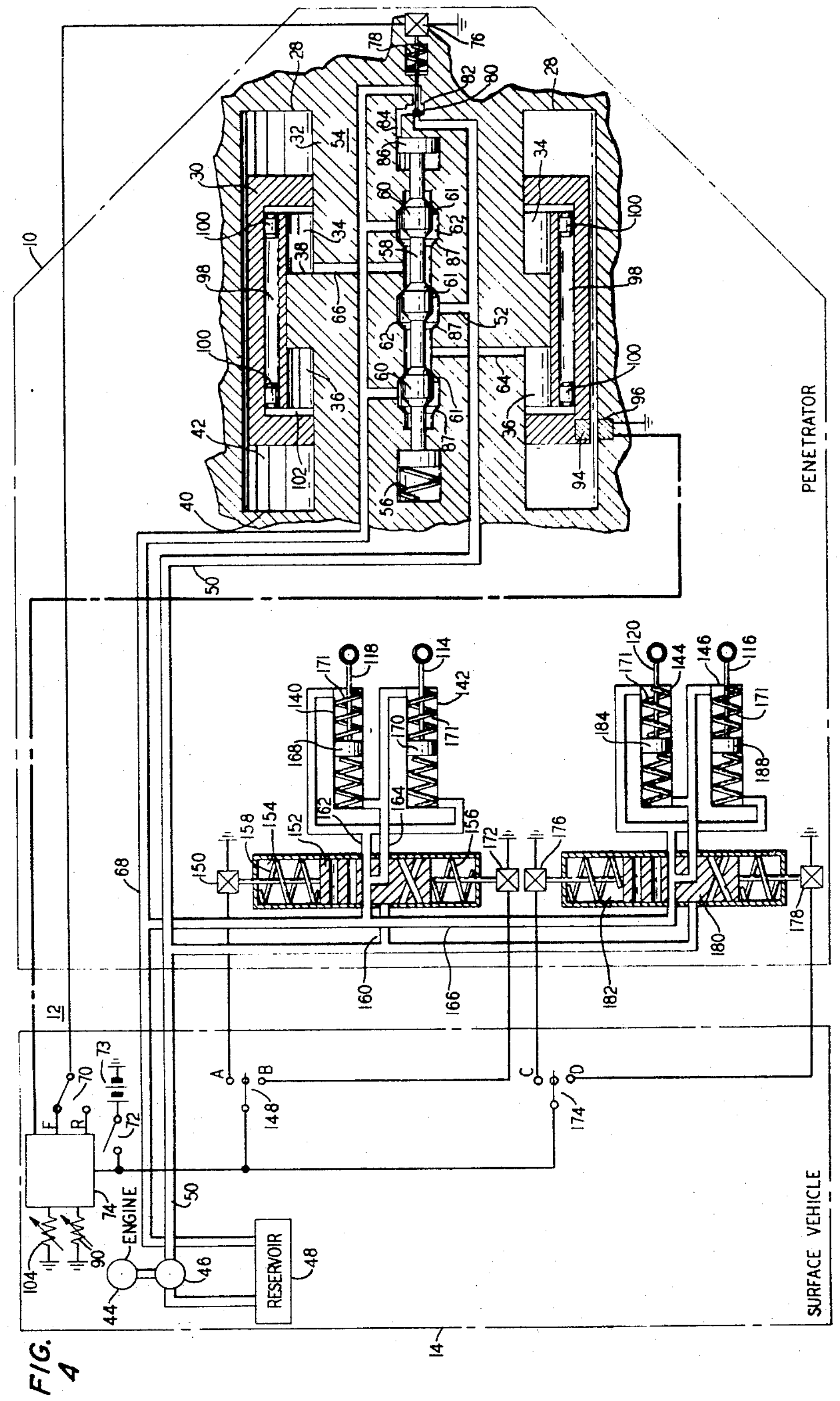
FIG. 4 is a schematic diagram illustrating the hydraulic and electrical systems for driving and controlling the penetrator in FIGS. 1, 2 and 3.

FIGS. 2 and 3 show cross-sectional details of the penetrator in FIG. 1. However, these details and the operation of the penetrator 10 may be most readily understood from consideration of the schematic diagram in FIG. 4 which also includes portions of the surface vehicle 14 in schematic form. Reference to FIG. 4 should be considered as referring also to the corresponding members in the other figures.

In FIG. 4 as well as the other figures, the penetrator is advanced through the soil in the forward direction by repeatedly striking a fixed annular forward anvil 28 within the penetrator housing, with a hollow cylindrical hammer 30 that reciprocates axially on a central arm 32 projecting from the anvil. The hollow hammer 30 is reciprocated hydraulically along the arm 32 by alternately applying hydraulic fluid under pressure to a forward annular interior chamber 34 and then a rear annular interior chamber 36, both formed by the cylindrical interior of the hollow hammer and a radially projecting annular dividing wall 38 hydraulically separating the two chambers. To move the penetrator in the reverse direction the hammer successively strikes a rear anvil 40 at the rearward portion of an empty air chamber 42 in which the hammer rides.

Figure 5:
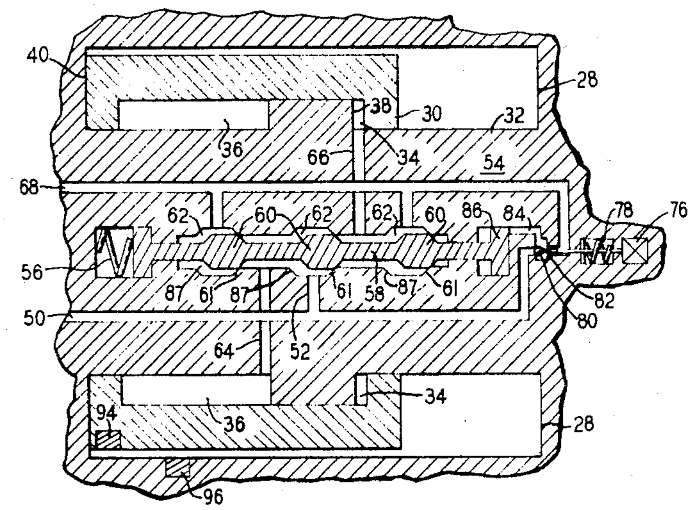
FIG. 5 is a schematic detail illustarting the hydraulic systems of FIG. 4 with elements in other operating positions.

The penetrator is started by actuating a gasoline or diesel engine 44 that drives an hydraulic pump 46. The latter forces fluid from a sump or reservoir 48 through a supply line 50 passing from the surface vehicle 14 through cable 12 and the central arm 32. The pressurized fluid arrives at an entrance port 52 of a four-way spool valve 54 in the center of the arm 32. In the valve 54 a spring 56 axially moves a valve stem 58 into a quiescent position wherein separate spools 60 are forced against three separate forward valve seats 61. The pressurized fluid then flows from the pressurized entrance port 52 through a "quiescent" open channel designated 62 and a port 64 in the arm 32 to the rear chamber 36. This drives the hammer 30 to its most rearward position. Fluid in the forward chamber 34 flows outwardly through a passage 66 and channel 62 in the valve 54, and through an outlet passage 68 in the cable 12 as well as the surface vehicle 14. The outlet passage 68 terminates in the reservoir 48. The hammer then assumes the rearward position shown in FIG. 5.

Figure 7:
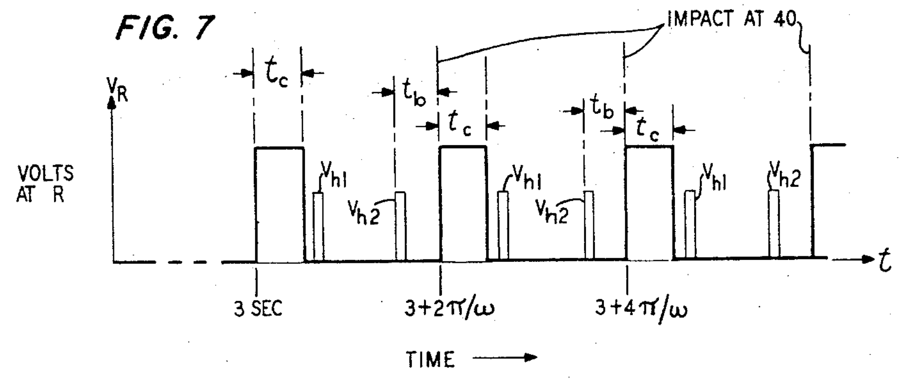
Figure 8:
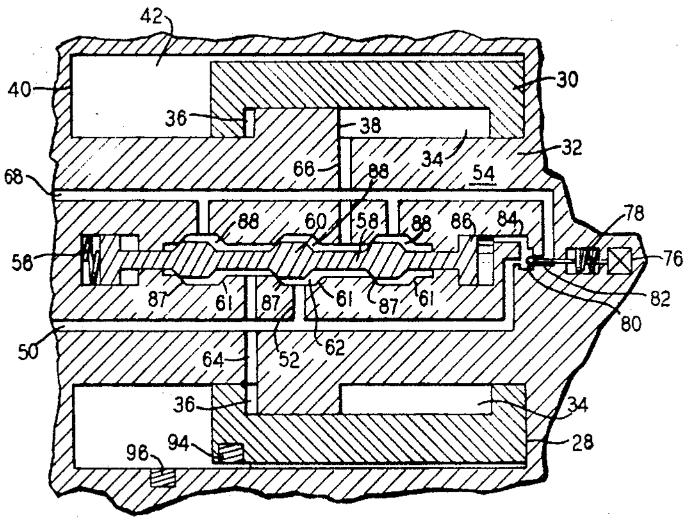
FIGS. 8 to 11 are further schematic details of the system in FIG. 4 illustrating the shift of elements during operation of the penetrator in FIGS. 1, 2, 3 and 4.

The penetrator is then set for movement by setting a single-pole double-throw switch 70 in either the forward position F or the reverse position R. By closing a starting switch 72, at an electrical source 73, an operator energizes a control circuit 74 to generate signals appearing for the position F in FIG. 6, and for the position R in FIG. 7 at the time 0. If the switch 70 is set in position F a 28-volt signal energizes a solenoid 76 in the arm 32 of the penetrator 10. The solenoid 76 then compresses a spring 78. The latter then releases a hydraulic control ball 80 from its supply-line-obstructing position shown in FIG. 4. Hydraulic fluid in the supply line 50 now pushes the ball 80 against a valve seat in a wall 82, and flows through an entrance port 84. This applies pressure against a piston 86 at the end of the valve stem 58. The pressure compresses the spring 56 and moves the valve stem 58 back so the spools 60 rest against the rearward seats 87 of the valve 54 as shown in FIG. 8. Fluid now flows through hitherto closed passages 88. The pressurized fluid in the line 50 which appears at the entrance port 52 now flows through the passage 66 in the central arm 32 to the forward chamber 34. This pressurized fluid drives the hammer away from the rear anvil 40 toward the front anvil 28 in the chamber 42. Fluid existing in the rear chamber 36 flows through the port 64 in the arm 32 through one of the passages 88 through the line 68 into the fluid reservoir 48. The hammer 30 then travels against the anvil 28 and comes to rest as shown in FIG. 8.

Figure 6:
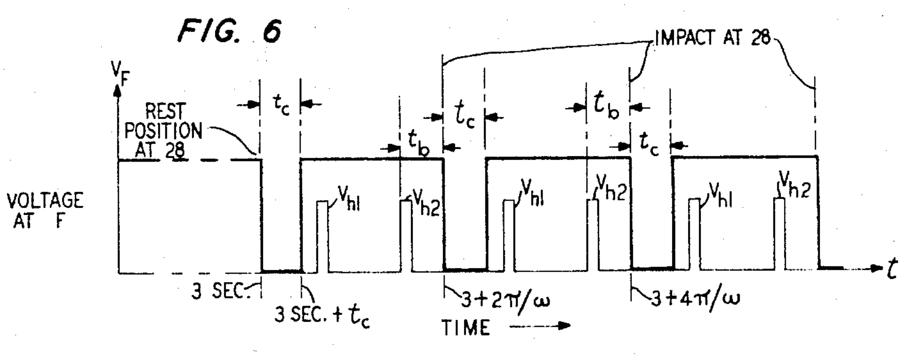
FIGS. 6 and 7 are time-voltage graphs illustrating the control voltages for actuating and operating the penetrator drive system.

Three seconds after the start switch 72 has closed, the circuit 74 steps the voltage at terminal F to zero. This is shown in the graph of FIG. 6 as the first negative-going step. It de-energizes the solenoid 76. The spring 78 then moves the ball 80 against its seat in the wall opposite wall 82. This connects the entrance port 84 at the piston 86 to the outlet passage 68 so as to relieve the pressure of the valve stem 58 against the spring 56. The spring 56 returns the valve stem 58 to its quiescent position shown in FIG. 5. Thereby pressure from the supply line 50 builds in the rearward chamber 36 and the pressure in the forward chamber 34 is relieved through the channel 62 to the outlet passage 68. The hammer 30 now moves to the rear.

Figure 9:
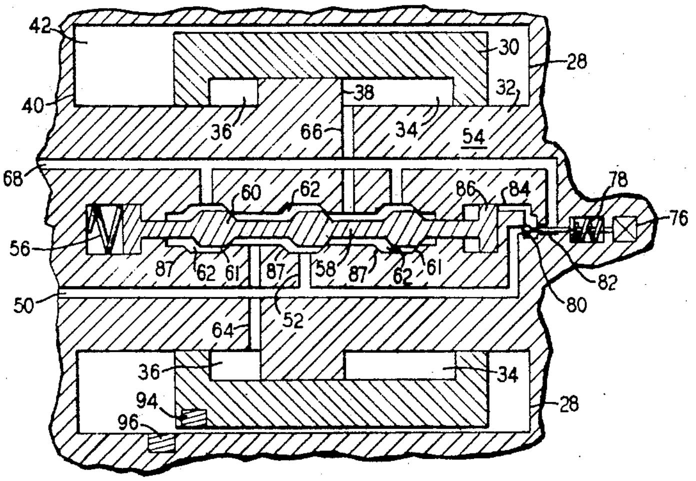

The rearward motion is slowed down by a positive step at the end of a time $t_c$ which is established by a potentiometer 90 in the control console 18. Just before the step at time $t_c$ the valve and the hammer positions shown in FIG. 9 prevail. After the step at time $t_c$ the solenoid 76 again causes reversal of flow into the chambers 34 and 36 by moving the valve 54 to the position shown in FIG. 8 so that the greater pressures in the forward chamber decelerate the hammer. Thus the end of time $t_c$ introduces the start of forced reversal. However, the rearward hammer movement continues because of the hammer's momentum. The pressure in the forward chamber stops the hammer short of the rear anvil 40 at the position shown in FIG. 11.

The time $t_c$ is adjusted for different soil conditions so that the hammer rebounds almost to the rear anvil before the forward hydraulic force reverses the hammer motion. At the same time it is adjusted so that hammer avoids hitting the rear anvil. Therefore, in soft soils, or in air at the start of a run before the penetrator enters the soil completely, the time $t_c$ is adjusted to be shorter than in stiff soils. This is to prevent the comparatively free forward movement of the penetrator after each impact from moving the rear anvil forward fast enough to strike the rear of the rebounding hammer. In stiff soils time $t_c$ must be longer than in loose soils. Otherwise the hammer's rebound stroke in the slowly moving penetrator would stop so far from the rear anvil the striking stroke would be too short to effect significant forward motion. The same conditions apply to achieve rearward motion.

The time $t_b$ is generally the same for all soil conditions. It is adjusted to furnish a rebound pressure as soon as but not before the hammer strikes its anvil. This assures maximum impulse with each hammer strike.

By virtue of the adjustments in times $t_c$ and $t_b$ the hammer applies the maximum driving impulse without the danger of hitting the reverse anvil and stopping effective forward motion.

The end of time $t_c$ occurs before a magnet 94 on the rearward-moving hammer 30 passes a magnetic sensor 96 composed of a Hall voltage generator. The voltage $V_{h1}$ from the Hall voltage generator produced by passage of the magnet actuates a divide-by-two circuit such as a bistable flip-flop. Previous movement of magnet 94 on the hammer did not actuate the divide-by-two circuit because the control circuit 74 is set to ignore these earlier pulses.

In order to prevent any pressure transients upon the annular dividing wall 38 as the result of the hammer's motion, a double-acting accumulator within the hammer communicating with both chambers continuously maintains approximately constant fluid pressure in the forward chamber 34. The accumulator is composed of four peripherally distributed longitudinal bores 98 in the hammer 30. In each bore pressurized nitrogen presses opposing pistons 100 outwardly against the pressure of the fluid that arrives through the respective annular spaces 102 from the respective chambers 34 and 36.

Figure 11:
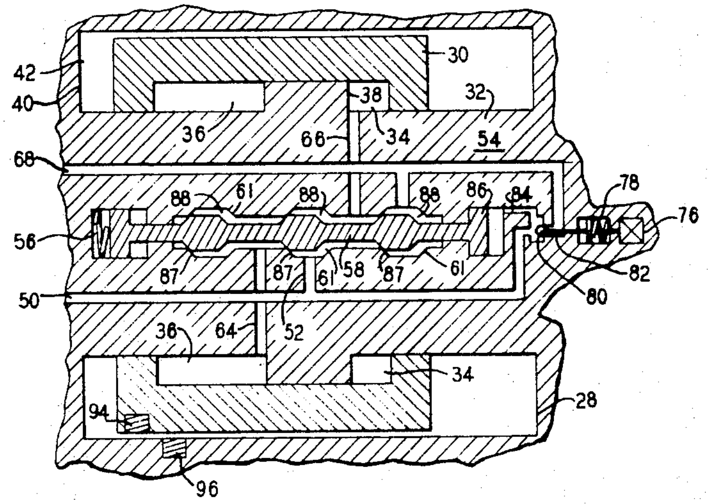

The pressure then in chamber 34 after the hammer position of FIG. 11 is reached moves the hammer forward. It drives the hammer 30 against the anvil 28. As the hammer starts approaching the anvil 28, the magnet 94 again passes the Hall generating magnetic sensor 96. This produces a voltage pulse $V_{h2}$. The control circuit 74 now energizes a delay $t_b$ established by a potentiometer 104 to last until just at the expected impact of the hammer 30 against the anvil 28.

At the end of time $t_b$ the hammer 30 strikes the anvil 28. At the same time the solenoid 76 starts releasing the control ball 80 so that valve 54 now directs pressurized fluid into the rear chamber 36 to move the hammer 30 away from the anvil 28. As the solenoid acts to release the ball 80 at the end of time $t_b$ the circuit 74 initiates the time delay $t_c$ again. During this delay the hammer travels toward the position of FIG. 9. Time $t_c$ ends to reverse the valve 54 before pulse $V_{h1}$. However, the inertia of the hammer carries it so the magnet 94 causes the Hall generator to release its odd pulse to the counter. The hammer 30 starts to return in response to valve 54 after it reaches the position of FIG. 11. The counter produces no output at the new odd pulse $V_{h1}$. The cycle then repeats itself.

This reciprocation of the hammer 30 occurs rapidly at approximately 6 cycles per second, a time period $t$ of .167 second. The time period may be adjusted with the potentiometers 90 and 104 either by the console 18 or by an operator to accommodate the hammer's reaction to the resistance of the soil. The accumulator has its pistons 100 moved inwardly only when the pressure in one or the other chamber 34 or 36 exceeds the force created by the pressurized nitrogen in the bores 98. The pressure of the nitrogen keeps the force upon the hammer uniform as the motion is reversed and the hammer is decelerated at the end of the withdrawal stroke and accelerated at the start of the striking stroke.

Each time the hammer 30 strikes the anvil 28, because the anvil 28 is secured to the housing of the penetrator 10, the entire penetrator moves forward due to the shock applied by the hammer. On the other hand, by virtue of the accumulator's maintaining the pressure approximately constant in the chamber 34, rearward pressure buidup upon the dividing wall 38 and hence the arm 32 and the rear anvil 40 is substantially avoided. While center of mass of the penetrator actually shifts to the rear with the rearward motion of the hammer 30, the outer frictional forces upon the penetrator are sufficient to prevent it from moving to the rear. The imbalance during reciprocation, of pressures and shocks upon forward and rear anvils 28 and 40, drives the penetrator forward.

Figure 10:
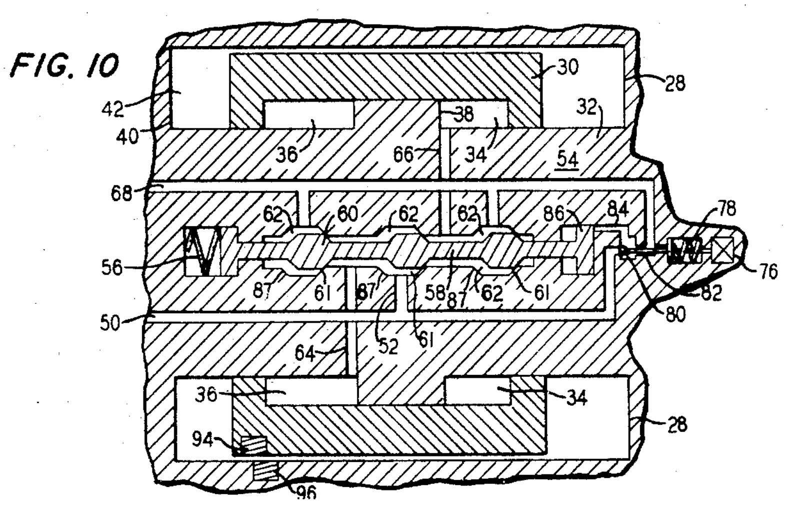

To reverse the direction of the penetrator motion an operator switches the switch 70 to the reverse position R. Such a reverse motion is desirable when the operator notes that the penetrator has encountered rocky subsoil formation which it cannot penetrate and which should be avoided. In the reverse position the control circuit 74 is reversed in voltage as shown in FIG. 7. Thus the effect of currents upon the solenoid is the reverse of that described for FIG. 6. The initial output signal from the circuit 74 keeps the solenoid 76 in its unactivated condition. During this time pressurized fluid is driven to the port 64 to maintain the hammer 30 against the rear anvil 40. There it rests until the end of three seconds of zero voltage from the terminal R. Solenoid 76 is then actuated for the period $t_c$. This reverses the valve 54 and drives the hammer forward for the period $t_c$. When the time $t_c$ terminates the positions are as shown in FIG. 11. The solenoid is then de-energized to effect the valve position of FIG. 10 and force on the hammer is reversed. During reversal of the flow to the hammer the latter continues movement so that the magnet 94 generates a pulse in the Hall generating magnetic sensor 96. The time $t_c$ is adjusted to allow the subsequent fluid flow to stop the hammer before it strikes the forward anvil. At the time of first voltage pulse, $V_{h1}$ in the Hall generating magnetic sensor 96 the hammer is still moving forward. The first pulse $V_{h1}$ merely sets the counter or divide-by-two circuit. When the flow initiated by the valve 54 at the end of time $t_c$ has finally reversed the direction of the hammer motion, the hammer starts moving back. The magnet 94 again passes the Hall generating magnetic sensor 96 on this return to generate a voltage pulse $V_{h2}$. The second pulse restores the counter and circuit 74 to its original condition and starts the timer whose total delay is set by potentiometer 104 to end just before impact. At impact the voltage position R has reversed and the cycle begins anew. In this manner, the constantly reciprocating hammer 30, as it strikes the rear anvil, drives the penetrator backwards.

In addition to the forward and rearward motion the operator at the control console 18 of the vehicle 14 is capable of directing the penetrator around obstacles by steering it. This steering is aided by means of the guidance devices 26 just above the ground in the vicinity of the proposed path of the penetrator. The guidance devices 26 may be of various types. According to one embodiment of the invention they are electromagnetic sensors responding to signals produced by the penetrator in a transmitter T. According to another embodiment of the invention they are sonic sensors responding to the pounding of the hammer 30 against the anvils 28 or 40. Such sonic detectors are connected to each other and to the computer in the console 18 so as to compute the position of the penetrator and control its motion toward a target. The guidance devices 26 may also be antennae along the penetrator path.

According to another embodiment of the invention, the guidance devices 26 are signal transmitters or transmitter antennae while the transmitter T constitutes a sensor which transmits signals to the console 18. In that case the guidance devices 26 receives the signals from the signal transmitters and calculate the position of the penetrator in the computer of the console 18.

Figure 14:
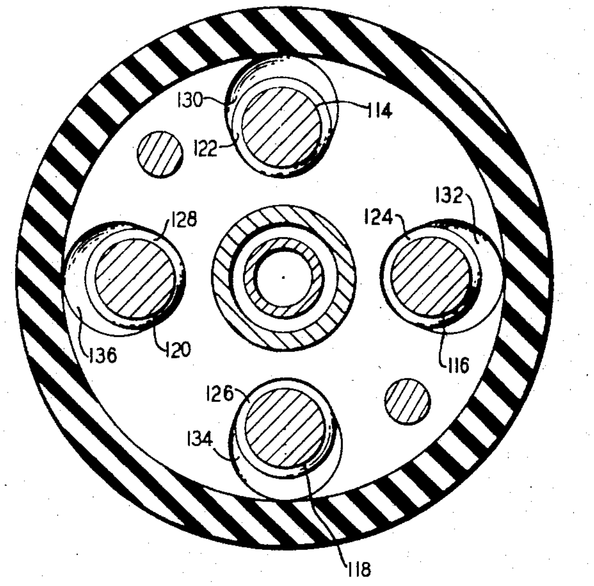
FIG. 14 is a section 14—14 of FIG. 13.
Figure 12:
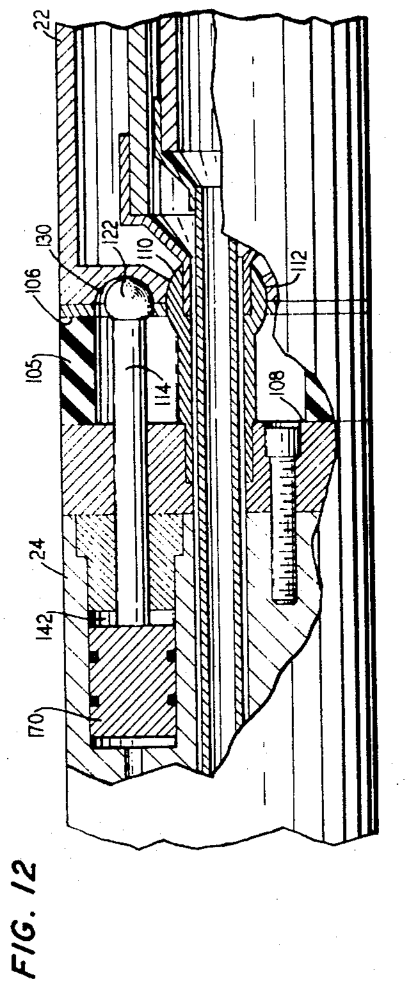
FIG. 12 is a cutaway cross-sectional view of the steering apparatus in the penetrator of FIGS. 1, 2, 3 and 4.
Figure 13:
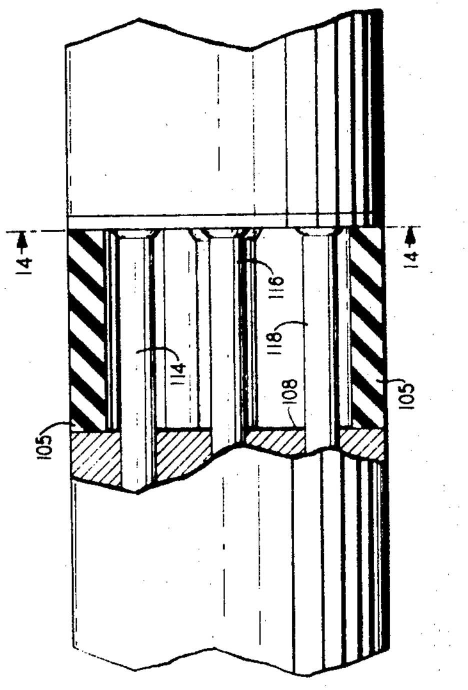
FIG. 13 is another cutaway cross-section of the view in FIG. 12.

The steering function is accomplished in the hinge coupler 20. Details of this hinge coupler appear in FIGS. 12, 13 and 14. Here, inside a rubber gasket seal 105 which is secured to the rear and forward faces 106 and 108 of the nose 22 and tail 24, the tail 24 is hinged to the nose 22 by means of a ball joint 110 extending out of the tail and into the nose. The ball joint 110 rests in a firm ball socket 112 within the nose. Thus, the tail can hinge about the nose in any direction while the seal 105 prevents entry of debris into the base between the nose and tail.

Emerging from the tail parallel to the ball joint in peripherally located positions are four plungers 114, 116, 118 and 120 terminating in four ball joints 122, 124, 126 and 128 that loosely lie in four ball sockets 130, 132, 134 and 136. The plungers 118, 114, 120 and 116 are driven from cylinder-piston assemblies 140, 142, 144 and 146 whose operations are specifically described with respect to the steering mechanism in FIGS. 2 and 4. However, to complete the understanding in FIGS. 12, 13 and 14, when the plunger 114 is advanced and the plunger 118 retracted the force tilts the head and tail relative to each other. This causes the advancing or retracting penetrator to follow an arc. Reverse of these plunger positions causes it to follow a second arc opposite to the first. Advance of the plunger 116 and retraction of plunger 120 forces the head and tail of the penetrator to tilt relative to each other transverse to the previous tilt. This forces the penetrator while moving to follow a third arc transverse to the first two arcs. Reverse positions of the plungers 120 and 116 produce a movement of the penetrator in a fourth direction opposite to the third.

The hydraulic and electrical mechanism for actuating the plungers 114, 116, 118 and 120 appears in FIG. 4. To move the penetrator in the first direction, the operator or the control console 18 moves the armature of a three-pole switch 148 from its neutral central position to the A position thereby passing current from the positive pole of the battery or source 73 through a solenoid 150. The solenoid then forces the piston 152 in a control cylinder 154 down from its central quiescent condition in FIG. 2 to compress a centering spring 156 and expand a centering spring 158. In its central position the piston 152 aligns a blind bore with a hydraulic line 160 from the pump 46. There the piston also aligns suitable bores communicating with outgoing lines 162 and 164 with a line 166 going to the reservoir 48. In this position the lines 162 and 164 are substantially relieved of pressure and the pistons 168 and 170 in the cylinders of assemblies 140 and 142 are centered by suitable springs 171. In its displaced position with the piston 152 down as shown in FIG. 4, the piston aligns bores within the cylinders so as to complete fluid flow from the line 160 to the line 164 thereby displacing the piston 168 to the right and the piston 170 to the left. The piston 152 also provides a path from the line 162 which receives the flow from the displaced pistons 168 and 170 in the cylinders of assemblies 140 and 142 to the outlet line 166. The action of the pistons 170 and 168 moves the plunger 114 into its cylinder and the plunger 118 out from its cylinder thereby tilting the penetrator nose 22 and tail 24 relative to each other so as to achieve a turn in one direction.

Return of the armature in the switch 148 to the central position again realigns the nose and tail of the penetrator. This occurs because it de-energizes the solenoid 150 to allow the piston 152 to return to its central position thereby allowing all fluids in the cylinders of assemblies 140 and 142 to return to the reservoir 48 through the line 166.

Placing the armature of the switch 148 to its opposite B position energizes the solenoid 172 to force the piston 152 into an upward position as shown in FIG. 4. This reverses the alignments of the lines 162 and 164. In this position the line 162 is in communication with the supply line 160 and the line 164 with the outlet line 166. As a result the entire plunger processes are reversed and the penetrator constrained to follow an arc opposite to the first. Return of the armature and switch 148 to a central position again straightens the nose and tail of the penetrator so that it follows a substantially straight line.

A single-pole three-position switch 174 corresponding to the switch 148 controls a solenoid 176 and a solenoid 178 for operating a piston 180 in a cylinder 182 in a manner corresponding to the piston 152 in the cylinder 154. In this manner pistons 184 and 188 in the cylinders of assemblies 144 and 146 perform the same function for steering the penetrator to the third and fourth direction transverse to the first two by regulating the plungers 120 and 116 as that performed by the cylinders of assemblies 140 and 142 for steering the penetrator. When the piston 184 draws the plunger 120 inwardly the piston 188 pushes the plunger 116 outwardly and thereby steers the penetrator to a direction transverse to those set by the switch 148. The opposite motion steers the penetrator to the other in the opposite direction.

According to one embodiment of the invention the penetrator possesses fins, not shown, to eliminate roll. The steering is then controlled on an "up," "down," "right" and "left" basis.

According to another embodiment of the invention the penetrator is permitted to roll. Steering is accomplished by the control console 18 on the basis of departure of the penetrator from a predetermined course and on the basis of the penetrator's roll position determined by directional sensors 200 in the penetrator.

Figure 15:
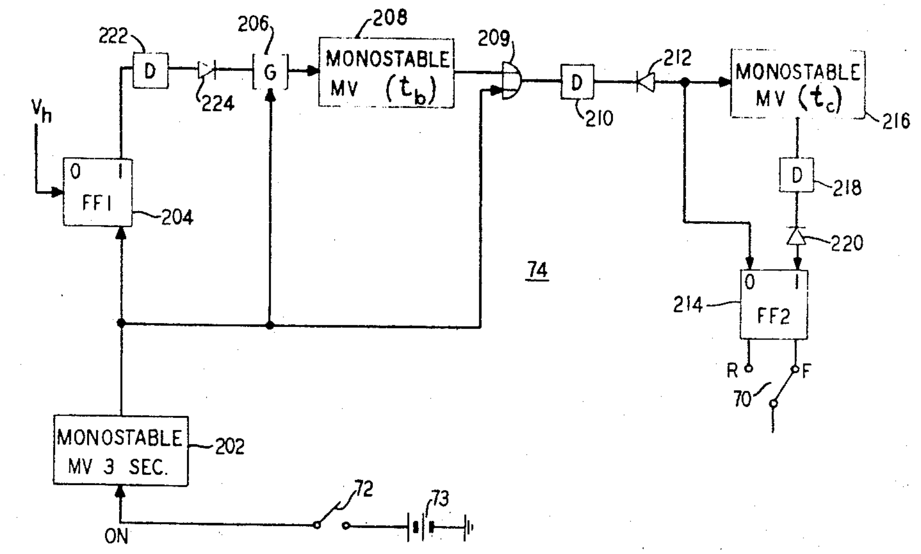
FIG. 15 is a block diagram of an electric circuit for energizing the hydraulic system in FIGS. 1 to 4.
Figure 16:
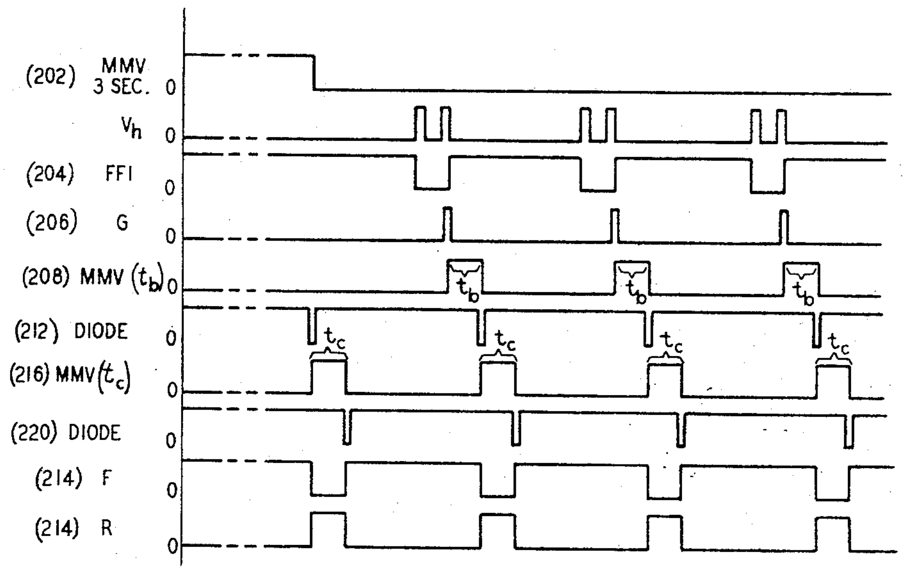
FIG. 16 is a series of curves illustrating the output voltages for circuit elements in FIG. 15.

According to one embodiment of the invention the circuit 74 appears as shown in FIG. 15 and the voltages at the various circuit elements vary as shown in FIG. 16. In FIG. 16 the parenthesized numerals denote the elements whose output voltages are depicted. In FIG. 15, when the switch 72 is turned on it actuates a monostable multivibrator 202 which generates a positive output for three seconds as shown in FIG. 16. During that time the multivibrator 202 sets and holds a flip-flop 204 to its 1 or on position. A gate 206 also receiving the output multivibrator 202 prevents any voltages that arise due to the change in the flip-flop 204 from reaching a second monostable multivibrator 208 during the three-second period. The positive signal from the multivibrator 202 also reaches a differentiator 210 through an OR gate 209. The differentiator forms respective positive- and negative-going pulses from the positive-going and negative-going steps of the multivibrator 202. A diode 212 passes only the negative-going pulse, that is the one occurring after the three-second delay to set a flip-flop 214 to its zero position at the output terminal F as shown in FIG. 16.

At the same time this negative-going pulse operates a monostable multivibrator 216 that immediately emits a positive-going output step and after the time $t_c$ a negative-going output step as shown in FIG. 16. A differentiator 218 forms the steps into positive- and negative-going pulses and a diode 220 passes only the negative pulse at the end of time $t_c$ to flip for flip-flop 214 to its one position at terminal F. See FIG. 16. After the three-second delay the multivibrator 202 removes its potentials and stops affecting the circuit.

Upon the occurrence of the first pulse $V_h$ from the Hall generator after the three-second delay, the flip-flop 204 is flipped to its zero position. The second pulse returns it to the one position. A differentiator 222 forms respective negative- and positive-going pulses from the flip-flop. A diode 224 passes only the positive-going pulse through the gate 206, which has been opened by the change of voltage at the multivibrator 202 after the three-second delay, to energize the monostable multivibrator 208. The latter emits a positive pulse for the time $t_b$. The differentiator 210 and diode 212 extract a negative-going pulse appearing at the end of time $t_b$ and apply it to the flip-flop 214 to set the latter to its on or one position at terminal F. The monostable multivibrator 216, upon also receiving the negative-going pulses generates a step for the time $t_c$. The diode 220 and differentiator 218 apply these to the other input terminal of the flip-flop 214 to return the output of terminal F to one as shown in FIG. 16.

Additional pulses $V_h$ at the flip-flop 204 repeat this cycle. In the flip-flop 204 the pulses $V_h$ are applied to an input terminal which responds by flipping the circuit with each new input pulse. However, the voltage from multivibrator 202 appears at a terminal that sets the flip-flop in one mode and holds it despite the occurrence of other voltages such as $V_h$ on other terminals.

At the terminal R in flip-flop 214 the output is the opposite of that at the terminal F. This is also shown in FIG. 16.

The invention furnishes a steerable and reversible penetrator capable of operating in a variety of soils, at maximum efficiency, without its hammer's striking the rear anvil in soft soils, and over a predetermined course without having to dig up the penetrator at each turn.

While embodiments of the invention have been described in detail, it will be obvious to those skilled in the art that the invention may be embodied otherwise without departing from its spirit and scope.

What is claimed is:

1. A subterranean penetrator system comprising housing means, anvil means fixed to said housing means, hammer means mounted in said housing means for reciprocal movement against said anvil means, hydraulic pressure means outside of said housing means for supplying hydraulic liquid, channel means for directing said fluid from said pressure means to said hammer means, valve means in said housing means for controlling the flow of said liquid so as to reciprocate said hammer means toward and away from said anvil means, and electrical means extending outside of said housing means for shifting said valve means so as to actuate said hammer means.

2. A penetrator system as in claim 1 wherein said housing means include second anvil means opposing said first mentioned anvil means and wherein said electrical means include means for selecting which of said anvil means is to be struck by said hammer means and for shifting said valve means to control the rate at which hammer means strike and retract from said second anvil means whereby said housing may be driven in opposing directions.

3. A penetrator as in claim 1 wherein said electrical means include control means for synchronizing the rate at which said hammer means strike said anvil means with the character of the soil.

4. A penetrator system as in claim 1 wherein said electrical means include sensors in the path of said hammer means to respond to the location of said hammer means.

5. A penetrator system as in claim 4 wherein said electrical means include pulsing means for controlling the time said valve means cause said hammer to move toward said anvil means and away from said anvil means after pssing said sensor means.

6. A pentrator as in claim 1, wherein said hammer means include accumulator means for absorbing the impact of said hammer means during retraction.

7. A penetrator as in claim 6, wherein said accumulator includes a gas pressurized chamber within said hammer means and having piston means to respond to the hydraulic pressure against said hammer means.

8. A penetrator as in claim 1, wherein said hammer means are annular and said piston means are annular, and wherein said hammer means ride on a central arm in said housing means.

9. A penetrator as in claim 8, wherein said hammer means have an internal open portion divided into two hydraulic chambers by a divider extending radially from said arm, and wherein liquid flow means passing through said arm introduce liquid selectively into said chambers.

10. A penetrator system as in claim 1 wherein said housing means are elongated and wherein steering means actuable outside of said housing control the direction of travel of said housing.

11. A penetrator system as in claim 10 wherein said steering means extend to director means outside of said housing and wherein sensor means along a desired path of said housing means furnish signals to said director means for regulating the path of said housing.

12. A penetrator system as in claim 10 wherein said steering means include joint means in said housing means of swivelling one section of said housing relative to the other.

13. A penetrator system as in claim 12 wherein said steering means include a plurality of rods between one section of said housing and the other for angularly positioning the sections.

14. A penetrator system as in claim 13 wherein said steering means further include hydraulic piston means for controlling the position of said rods.

15. A penetrator system as in claim 14 wherein said steering means include electrical means for controlling said piston means.

References Cited

UNITED STATES PATENTS

| | | | |
|---|---|---|---|
| 2,091,680 | 8/1937 | Greenlee | 173—91 |
| 3,137,483 | 6/1964 | Zinkiewicz | 173—91 X |
| 3,326,008 | 6/1967 | Baran et al. | 175—94 X |
| 3,407,884 | 10/1968 | Zygmunt et al. | 175—91 |

ERNEST R. PURSER, Primary Examiner

U.S. Cl. X.R.

61—72.7; 91—39; 173—21, 91, 115; 175—73; 254—134.6